United States Patent
Paintz et al.

(10) Patent No.: US 8,212,508 B2
(45) Date of Patent: Jul. 3, 2012

(54) RELATING TO DRIVING BRUSHLESS DC (BLDC) MOTORS

(75) Inventors: Christian Paintz, Erfurt (DE); Thomas Freitag, Erfurt (DE); Detlef Klose, Erfurt (DE); Enrico Reinhardt, Erfurt (DE)

(73) Assignee: Melexis NV, Ieper (BE)

( * ) Notice: Subject to any disclaimer, the term of this patent is extended or adjusted under 35 U.S.C. 154(b) by 844 days.

(21) Appl. No.: 12/208,206

(22) Filed: Sep. 10, 2008

(65) Prior Publication Data

US 2009/0096397 A1 Apr. 16, 2009

(30) Foreign Application Priority Data

Sep. 13, 2007 (GB) .................................. 0717851.0

(51) Int. Cl.
*H02P 6/18* (2006.01)
(52) U.S. Cl. .......... 318/400.34; 318/400.32; 318/400.35
(58) Field of Classification Search ............. 318/400.01, 318/400.34, 400.35, 400.14, 400.15, 400.33, 318/721, 400.32, 459; 388/901, 906, 839
See application file for complete search history.

(56) References Cited

U.S. PATENT DOCUMENTS

| | | | |
|---|---|---|---|
| 4,746,844 A | 5/1988 | MacKelvie et al. | |
| 4,772,839 A | 9/1988 | MacMinn et al. | |
| 4,928,043 A * | 5/1990 | Plunkett | 318/400.34 |
| 4,992,710 A | 2/1991 | Cassat | |
| 5,001,405 A | 3/1991 | Cassat | |
| 5,097,190 A | 3/1992 | Lyons et al. | |
| 5,191,270 A | 3/1993 | Mccormack | |
| 5,517,095 A * | 5/1996 | Carobolante et al. | 318/400.35 |
| 5,859,512 A * | 1/1999 | Buthker | 318/400.04 |
| 6,011,368 A | 1/2000 | Kalpathi et al. | |
| 6,034,493 A | 3/2000 | Boyd et al. | |
| 6,072,289 A | 6/2000 | Li | |
| 6,107,772 A | 8/2000 | Liu et al. | |
| 6,163,120 A * | 12/2000 | Menegoli | 318/400.35 |
| 6,795,268 B1 * | 9/2004 | Ryan | 360/78.04 |
| 6,825,646 B2 | 11/2004 | Colombo | |
| 7,138,776 B1 * | 11/2006 | Gauthier et al. | 318/400.34 |
| 7,141,949 B2 | 11/2006 | Harwood | |
| 7,166,980 B1 * | 1/2007 | LeGrand | 318/459 |
| 7,180,262 B2 | 2/2007 | Consoli et al. | |
| 8,030,867 B1 * | 10/2011 | Allison, III | 318/400.35 |
| 2004/0056627 A1 * | 3/2004 | Grasso et al. | 318/609 |

FOREIGN PATENT DOCUMENTS

EP 1478086 A2 11/2004

\* cited by examiner

*Primary Examiner* — Walter Benson
*Assistant Examiner* — Antony M Paul
(74) *Attorney, Agent, or Firm* — Leydig, Voit & Mayer, LLP; Gerald T. Gray

(57) ABSTRACT

In a three phase BLDC motor the rotor position is monitored by detecting the zero crossing points of the induced back EMF signals BEMF_U, BEMF_V, BEMF_W in the phase windings U, V, W. As they are illustrated, the back EMF signals are substantially sinusoidal but they may in other situations be substantially trapezoidal. The three back EMF signals are 120° out of phase with each other. In order to accurately monitor the back EMF in a phase winding, the driving waveform for each phase U, V, W includes an undriven period P close to the expected zero crossing point. The period P can be a preset part of the driving waveform or can be an interruption of the normal driving waveform in response to suitable interrupt signals. In order to determine the zero crossing points of each back EMF signal, two (or more) samples of the back EMF are taken during the undriven period P and used to interpolate the back EMF signal to determine the zero crossing point.

9 Claims, 4 Drawing Sheets

RELATING TO DRIVING BRUSHLESS DC (BLDC) MOTORS

CROSS-REFERENCES TO RELATED APPLICATIONS

This application claims priority to UK 0717851.0, filed Sep. 13, 2007, and which is hereby incorporated by reference in its entirety for all purposes.

BACKGROUND

The present invention relates to methods and systems used to drive multiphase brushless DC motors.

The magnetic field used to turn a permanent magnet rotor is generated using three (or more) interconnected phase windings in the stator of the motor. In a bipolar mode the current is driven through only two phase windings at a time and the third undriven phase winding is used to monitor the back EMF voltage. By monitoring the back EMF voltage, the position of the rotor can be determined. This is achieved by detecting the zero crossing point of the monitored back EMF waveform within the phase winding, the zero crossing point occurring when the rotor is in a defined position. If the position of the rotor is known, the driving of the phase windings may be synchronised with the rotor position for maximum power. An example of such a method is disclosed in U.S. Pat. No. 6,034,493 (Boyd et al).

In a tri-polar (or multi-polar) mode of operation all three phase windings are driven. Typically the three phases carry currents having sinusoidal or trapezoidal waveforms with relative phases of 120 degrees. The advantage of such an arrangement is that the torque ripple caused by driving only two coils at any one time is then minimized.

Disadvantageously, in multi-polar mode since the windings are each being driven all the time, the back EMF cannot be sensed in the conventional manner. Accordingly, the back EMF in a coil is sensed during a period when the driving current to said coil is interrupted, typically in response to an external signal. A comparator or similar can then be used to determine the occurrence of zero crossing during this undriven period. Various examples of such methods are described in U.S. Pat. No. 7,141,949 (Harwood), EP1478086 (Matsushita Electric), EP0892489 (ST Microelectronics), US2004/263104 (Iwanaga et al) and U.S. Pat. No. 7,235,939 (Viti et al).

To reliably detect the zero crossing point, the zero crossing point must occur during the undriven period. Accordingly, the duration of the undriven period must be long enough to take into account likely delays or advances of the zero crossing point. Delay or advance of the zero crossing point typically occurs due to dynamic motor speed changes which might occur during a fast start-up phase or in response to load changes.

There is therefore a conflict between the opposing desires of reducing the duration of the undriven periods (to increase torque and reduce noise) and increasing the duration of the undriven periods of time (to reliably detect zero crossings and hence accurately estimate rotor position for control purposes).

An additional problem is that the back EMF is proportional to motor rotational speed, being large at high rotation speed and zero at standstill. Therefore the back EMF zero crossing can only be detected on a running motor. Additionally, at low motor speeds, the back EMF is small and thus system noise can swamp the back EMF signal. Accordingly, reliable rotor position estimation becomes more difficult as motor speed reduces. To avoid such problems many motors are adapted to operate only above a preset minimum motor speed. In some applications however a low motor speed is desirable, for instance to reduce energy consumption.

It is therefore desirable to provide alternative methods of determining the zero crossing point of a phase winding in a BLDC motor which at least partially overcomes or alleviates the above problems.

BRIEF SUMMARY

According to a first aspect, there is provided a method of determining the zero crossing point of a phase winding in an electric motor, said method comprising the steps of: driving the phase winding with a suitable driving current waveform; providing an undriven period during the driving waveform; sampling the back EMF signal in the phase winding on two or more occasions during the undriven period; and interpolating the back EMF signal based on the back EMF samples to thereby determine the zero crossing point for the phase winding.

By generating and using an interpolation of the back EMF, the above method can reliably determine the zero crossing point even if the zero crossing point occurs outside the undriven period. This enables the undriven period to be kept short thus improving torque and reducing noise whilst still enabling a sufficiently accurate motor position to be calculated when the motor speed varies. This method is also less affected by noise and thus more reliable for detecting zero crossing points at low motor speeds.

The driving waveform may be of any suitable shape. In particular the driving waveform may be substantially sinusoidal or trapezoidal. The driving waveform may be varied in shape, amplitude or frequency in response to the determination of the zero crossing point.

The undriven period may be provided by an interruption of the driving waveform. The interruption may occur in response to a suitable interrupt signal. The interruption may end in response to a suitable interrupt end signal. Alternatively, the undriven period may be an integral part of the driving waveform. Such a method eliminates the need for an interrupt signal but may be less flexible.

The undriven period may have any suitable duration. The duration may be a constant duration or may be varied. In particular, the duration may be varied in accordance with motor speed or with rate of change in motor speed. In particular, the duration of the undriven period may be increased if the motor speed has been highly variable or if the motor speed is relatively low.

Each sample may be an instantaneous sample of the back EMF signal. Preferably, each sample comprises an integration of the back EMF signal over an integration period. By integrating the back EMF signal, effectively an average over the integration period is taken, thus reducing the effects of noise. The sampling may take place in response to suitable integration start and stop signals.

The integration period is preferably of equal duration for each sample taken during a particular undriven period. The duration of the integration period may be varied between undriven periods. The duration of the integration period may be varied in accordance with motor speed or with rate of change in motor speed. In particular, the duration of the integration period may be increased if the motor speed has been highly variable or if the motor speed is relatively low.

The interpolation may be a linear interpolation, a sinusoidal interpolation, a polynomial interpolation or any other suitable interpolation. The interpolation may include the step of determining whether a rising or falling signal should be expected. In a preferred implementation, the interpolation is a linear interpolation. In such an implementation, preferably only two samples are taken for each undriven period.

The undriven period may be offset with respect to the expected zero crossing point. In this manner, the samples are all likely to be non-zero and of the same sign.

The method may be adapted to be implemented in a brushless DC motor.

According to a second aspect, there is provided a method of determining the position of a rotor of an electric motor, said rotor having a plurality of phase windings comprising the steps of: determining the zero crossing point for one or more of the phase windings according to the method of the first aspect of the present invention and thereby determining the position of the rotor.

In such a manner, the position of the rotor can be determined during normal multiphase operation with the benefits described in relation to the first aspect of the present invention.

The method of the second aspect may be used in conjunction with any features of the method of the first aspect as desired or as appropriate.

According to a third aspect, there is provided a method of driving an electric motor incorporating the method of determining the zero crossing point of the back EMF in a phase winding of the first aspect of the present invention and/or the method of sensing the position of a rotor of the second aspect of the present invention.

The method of the third aspect may be used in conjunction with any features of the methods of the first and/or second aspects as desired or as appropriate.

According to a fourth aspect there is provided an electric motor driven by the method of the third aspect.

The motor of the fourth aspect of the present invention may be used in conjunction with any features of the methods of the first and/or second and/or third aspects of the invention as desired or as appropriate.

The motor may comprise a motor driving unit operable to generate the driving waveform for each phase winding of the motor. In embodiments wherein the undriven period is provided by interrupting the driving waveform, the motor driving unit may be operable to interrupt the waveform in response to a suitable interrupt signal and to reinstate the waveform in response to a suitable interrupt end signal. The motor driving unit may be operable to vary the shape, amplitude or frequency of the driving waveform in response to the determination of the zero crossing point and/or the rotor position.

The motor may comprise a back EMF sampling unit operable to sample the back EMF signal during the undriven period. The back EMF sampling unit may additionally be operable to remove a DC bias from said back EMF signal before sampling. The sampling unit may also comprise a subtractor for removing a DC offset from the back EMF signal before it is integrated. The sampling unit may also comprise filtering means such as an amplifier or a low pass filter.

In one embodiment, the back EMF sampling unit may comprise an integrator connected to a sample and hold circuit. The integrator may be operable to integrate the back EMF signal and output to the sample and hold circuit. The sample and hold circuit may be operable to output a signal indicative of the integrated back EMF signal value in response to a suitable integration stop signal. The integration may be initiated by closing a switch connecting the integrator to the signal indicative of the back EMF signal. The switch may be closed in response to a suitable integration start signal.

The sampling unit may comprise a multiplexer operable to connect the integrator to the appropriate phase winding. The sample and hold circuit may be connected to an analogue to digital converter so as to generate a digital output for processing.

The motor may comprise a zero crossing calculation unit operable to calculate the zero crossing point by interpolation from the back EMF samples. The zero crossing calculation unit may be operable to determine whether the calculated zero crossing value is likely to be valid. In the event that the calculated value is invalid, the value may be calculated by an alternative calculation unit operable according to a different method.

A position estimation unit may be provided, the position estimation unit operable to estimate the position of the rotor based on the calculated zero crossing value.

The motor may comprise a timing unit for providing a time signal. The motor may also comprise a synchronisation unit connected to said timing unit and operable to output control and timing signals to other components of the motor.

The motor may be a brushless DC motor. The motor comprises a permanent magnet rotor and one or more interconnected phase windings in the stator of the motor. In one preferred embodiment the motor has three phase windings.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In order that the invention is more clearly understood, particular embodiments will now be described further herein, with reference to the accompanying drawings, in which.

DETAILED DESCRIPTION OF THE INVENTION

Figure 1:
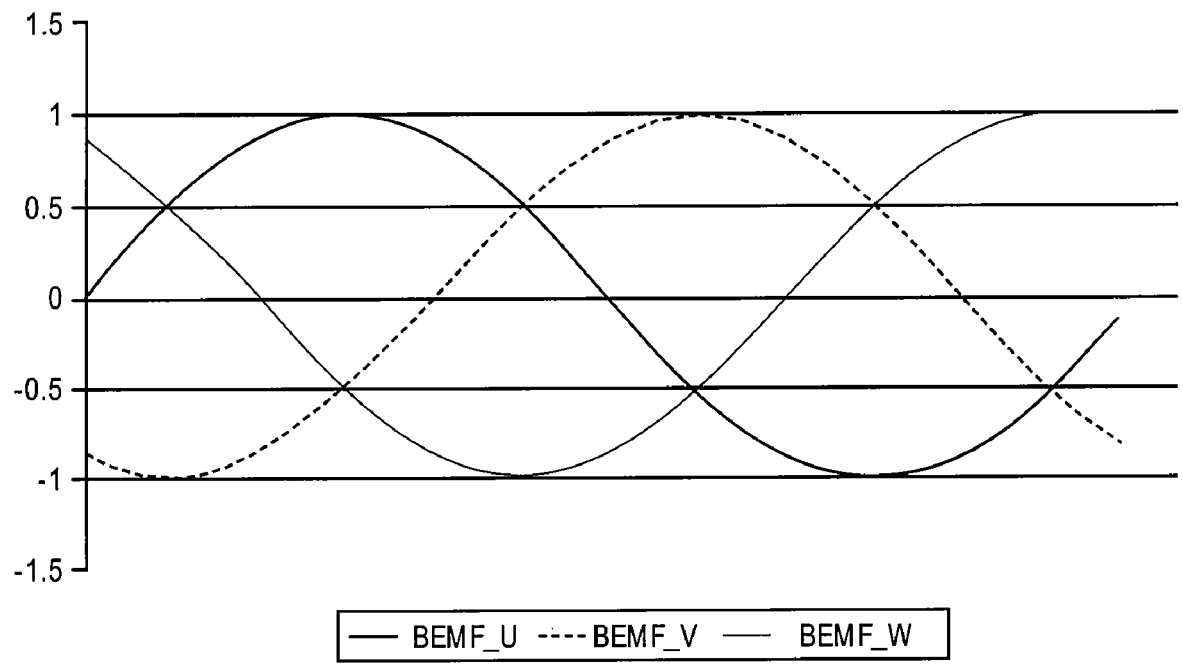
FIG. 1 is a schematic illustration of the induced back EMF in a three phase electric motor.

Referring to FIG. 1, there is shown the induced back EMF signals BEMF_U, BEMF_V, BEMF_W in three phase windings U, V, W of a three phase electric motor. As they are illustrated, the back EMF signals are substantially sinusoidal but they may in other situations be substantially trapezoidal.

The three back EMF signals are 120° out of phase with each other. Each instance when a back EMF signal BEMF_U, BEMF_V, BEMF_W is zero indicates that the rotor of the motor is aligned with the respective phase U, V, W and thus allows the instantaneous rotor position to be determined. In order to keep track of the rotor position and thereby ensure the correct driving waveforms are supplied to each phase winding U, V, W the back EMF signals BEMF_U, BEMF_V, BEMF_W are monitored to detect the zero crossing points. In the example shown in FIG. 1, the zero crossings occur in the order BEMF_U (rising signal), BEMF_W (falling signal), BEMF_V (rising signal), BEMF_U (falling signal), BEMF_W (rising signal), BEMF_V (falling signal).

In order to accurately monitor the back EMF in a phase winding, the driving current (and the derivative of the driving current with respect to time) must be zero. Accordingly, the driving waveform for each phase U, V, W includes an undriven period P close to the expected zero crossing point. The period P can be a preset part of the driving waveform or can be an interruption of the normal driving waveform in response to suitable interrupt signals.

Figure 2:
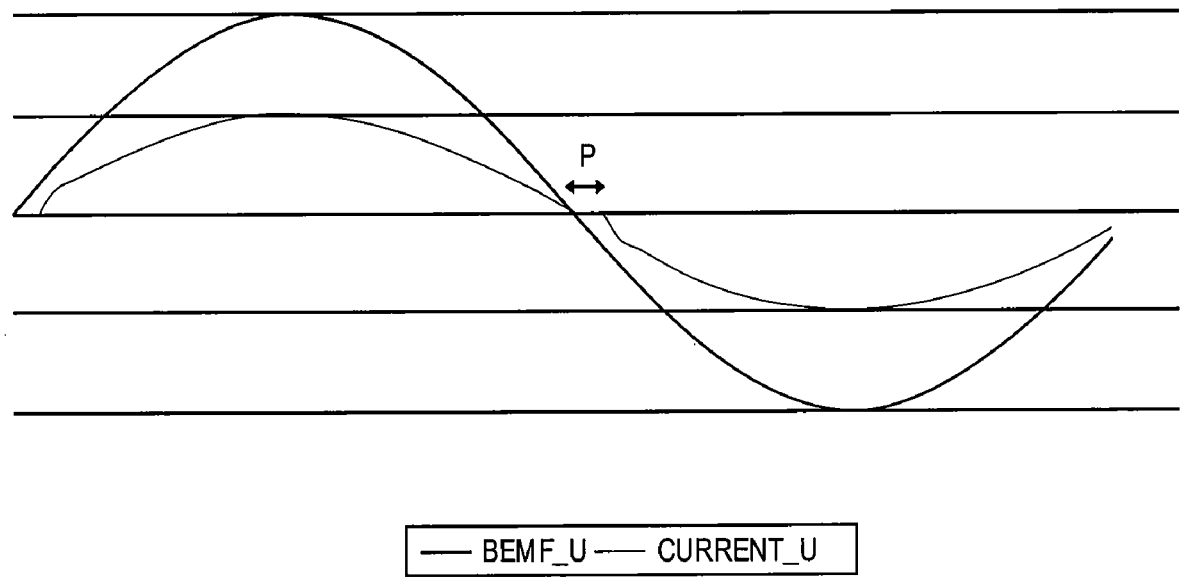
FIG. 2 is a schematic illustration of the induced back EMF signal for one phase of a motor alongside the driving waveform for the same phase of the motor in a method according to the one embodiment.

An example of a driving waveform for phase winding U having an undriven period P and the corresponding back EMF signal BEMF_U is shown in FIG. 2. The driving waveforms for phase windings V, W would be equivalent to that shown in FIG. 2, with an appropriate phase shift.

In order to determine the zero crossing points of each back EMF signal, in the method of the present invention, two (or more) samples of the back EMF are taken during the undriven period P and used to interpolate the back EMF signal to determine the zero crossing point. This method is illustrated in FIG. 3 and FIG. 4.

Figure 3:
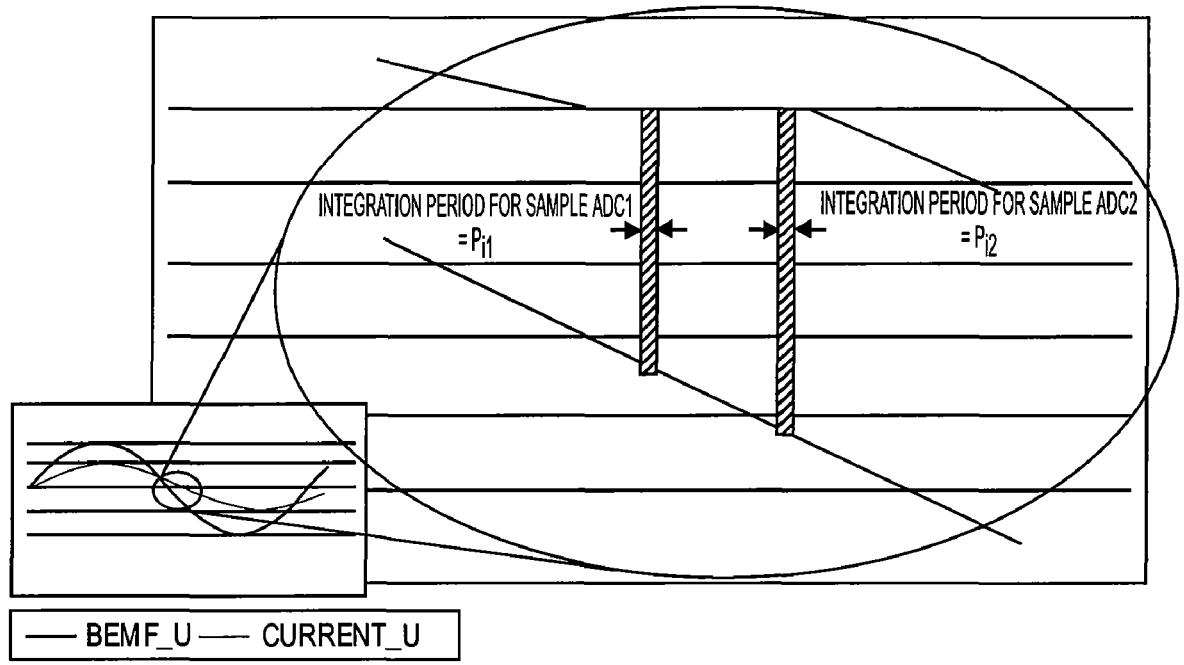
FIG. 3 is a schematic illustration of how the back EMF signal of FIG. 2 is sampled for interpolation.
Figure 4:
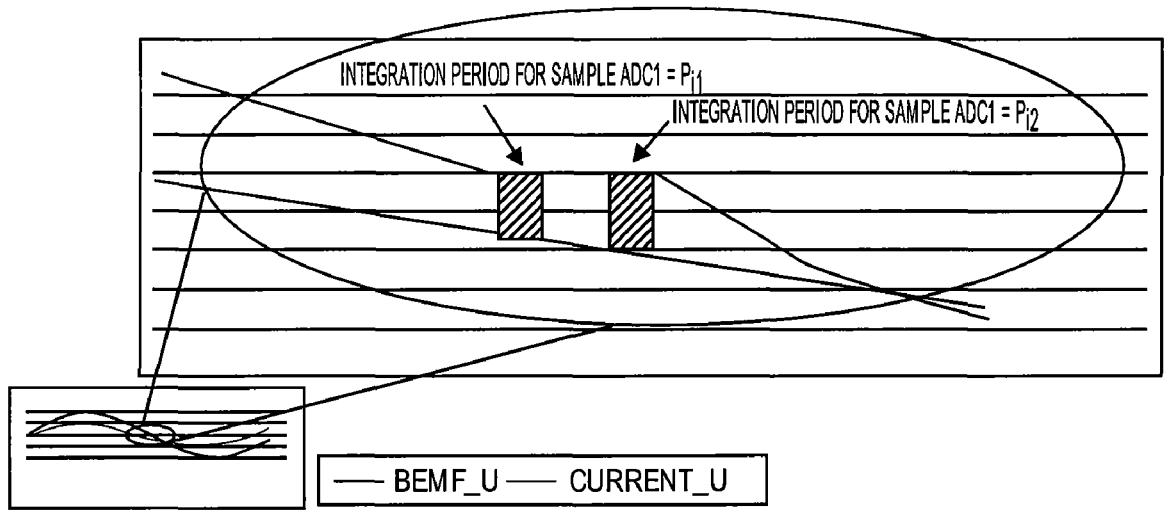
FIG. 4 is a schematic illustration of how the back EMF signal of FIG. 2 is sampled for interpolation in a motor operating at low speed.

Turning first to FIG. 3, an enlarged view of the undriven period P is shown. During the undriven period P, two samples of the back EMF signal BEMF_U are taken. In the example, the samples ADC1 and ADC2 are integrated samples taken over first and second integration periods $P_{i1}$ and $P_{i2}$. The integration period $P_{i1}$ and $P_{i2}$ are of equal duration t.

Given the assumption that the change in the actual back EMF signal during each integration period $P_{i1}$, $P_{i2}$ is small, then the samples $ADC_1$ and $ADC_2$ can be approximated to be:

$$ADC_1 = t^*[\text{mean value of back EMF during } P_{i1}]$$

$$ADC_2 = t^*[\text{mean value of back EMF during } P_{i2}]$$

Accordingly, $ADC_1$ and $ADC_2$ can both be considered to represent a quantity proportional to the back EMF signal.

By using an integrated sample rather than an instantaneous sample, noise filtering is improved. This is because it can be assumed, that the statistical mean value of the noise density distribution is zero. Therefore it is possible to increase the Signal to Noise Ratio of the back EMF signal by increasing the duration of the integration period $P_i$. The longer the integration period $P_i$, the larger the Signal to Noise Ratio of the back EMF signal samples. Of course, the longer the integration period $P_i$, the less well the assumption that the back EMF signal is substantially invarient holds. However, when the motor is operating at high speeds, a shorter integration period $P_i$ can be used because the back EMF signal is relatively large compared to the noise floor. At low motor speeds, the back EMF signal varies less but has proportional larger noise thus a longer integration period $P_i$ is used.

FIG. 4 illustrates the use of a longer integration period $P_i$ in the case of a lower motor speed than that illustrated in FIG. 3.

Figure 5:
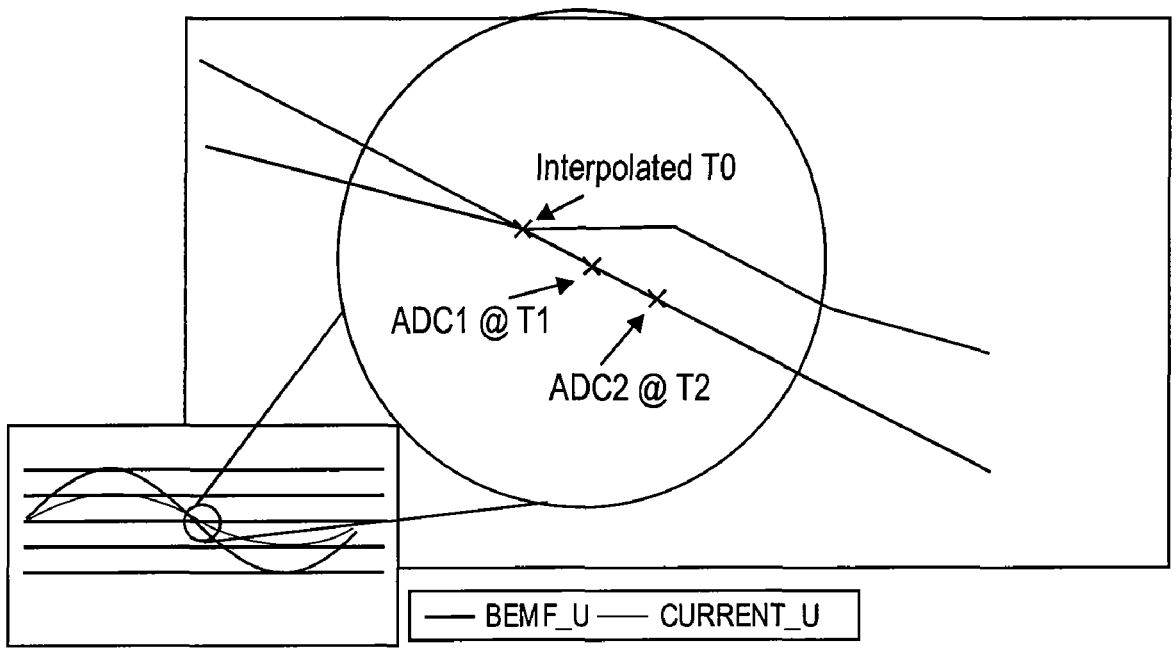
FIG. 5 is a schematic illustration of interpolation of the back EMF signal of FIG. 2 to determine the zero crossing point according to one embodiment.

Turning now to FIG. 5, the samples $ADC_1$ and $ADC_2$ are used to interpolate the back EMF signal to determine the estimated zero crossing point $T_0$ of the back EMF signal. For the sake of simplicity, the interpolation method described herein is a linear interpolation. It is however possible to use other interpolations as desired or as appropriate.

Now, assuming that sample $ADC_1$ is indicative of the back EMF signal at a time $T_1$ and the sample $ADC_2$ is indicative of the back EMF signal at a time $T_2$, then the zero crossing point occurs at a time $T_0$ which is given by:

$$T_0 = T_1 + (T_2 - T_1)^*(MID - ADC_1)/(ADC_2 - ADC_1) \text{ [Rising back } EMF]$$

or $$T_0 = T_2 + (T_2 - T_1)^*(ADC_2 - MID)/(ADC_1 - ADC_2) \text{ [Falling back } EMF]$$

where MID is the zero point value of the processing electronics. This may be non-zero if there are inherent offsets in the system or may be the mid-range value output by an analogue to digital converter used in the sampling process.

Looking again at FIG. 5, it can be seen that the interpolated $T_0$ is very close to the true zero crossing point. This is generally true for most sinusoidal or trapezoidal back EMF signals in a large window around the zero crossing point. Accordingly, this method allows a good approximation to the true zero crossing point to be calculated rapidly from two samples. It thus avoids the requirement for constant monitoring of the back EMF signal during the undriven period P.

Additionally, by increasing the duration of the integration period Pi, the Signal to Noise Ratio of the samples $ADC_1$ and $ADC_2$ can be increased thus allowing accurate rotor position estimation at low speed. This therefore facilitates reliable operation of a motor at lower speeds than previously possible.

Another benefit of the method of the present invention is that it can calculate a good value for the zero crossing point even if the zero crossing point does not occur during the undriven period P. This is illustrated with reference to FIG. 6, which shows a back EMF signal BEMF_U for a phase winding where there has been a sudden decrease in load thus resulting in the rotor turning faster than expected.

Figure 6:
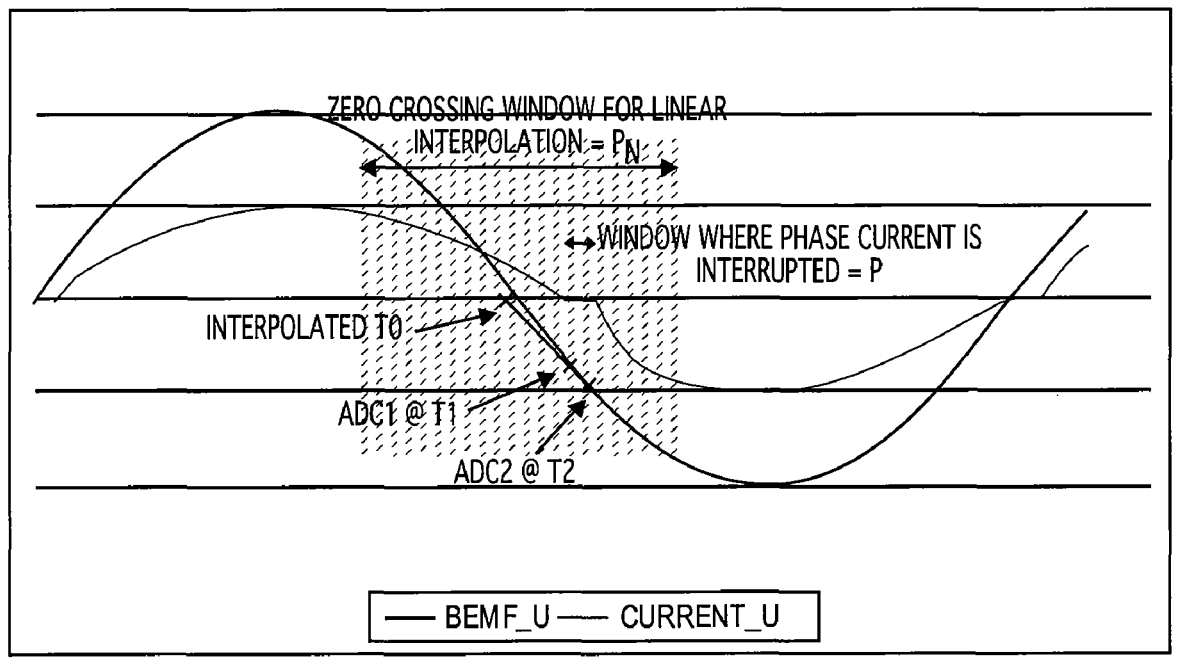
FIG. 6 is a schematic illustration of the effective window for determining the zero crossing point according to one embodiment compared with that in prior art methods.

As the rotor has turned more quickly than expected, the back EMF signal zero crossing has occurred before the undriven period P. In the method of the present invention, the samples $ADC_1$ and $ADC_2$ are taken as normal and $T_0$ is then calculated. As shown in FIG. 6, this is not precisely accurate but still provides a relatively close estimate of the true zero crossing point allowing the next driving phase of the waveform to be adjusted to coincide with rotor motion. Accordingly, the present invention can provide a sufficiently good determination of the zero crossing point, if the zero crossing point occurs anywhere within the extended window period $P_w$ illustrated. In contrast, the prior art methods may only determine a zero crossing point if the zero crossing point occurs during the undriven period P. Accordingly, the method of the present invention can operate with a relatively short undriven period P thus increasing torque and reducing vibration and noise yet still provide accurate determination of rotor position even as the rotor speed varies and/or at low rotor speeds.

In the present invention, the window period $P_w$ may be as much as ⅓rd of a cycle.

Figure 7:
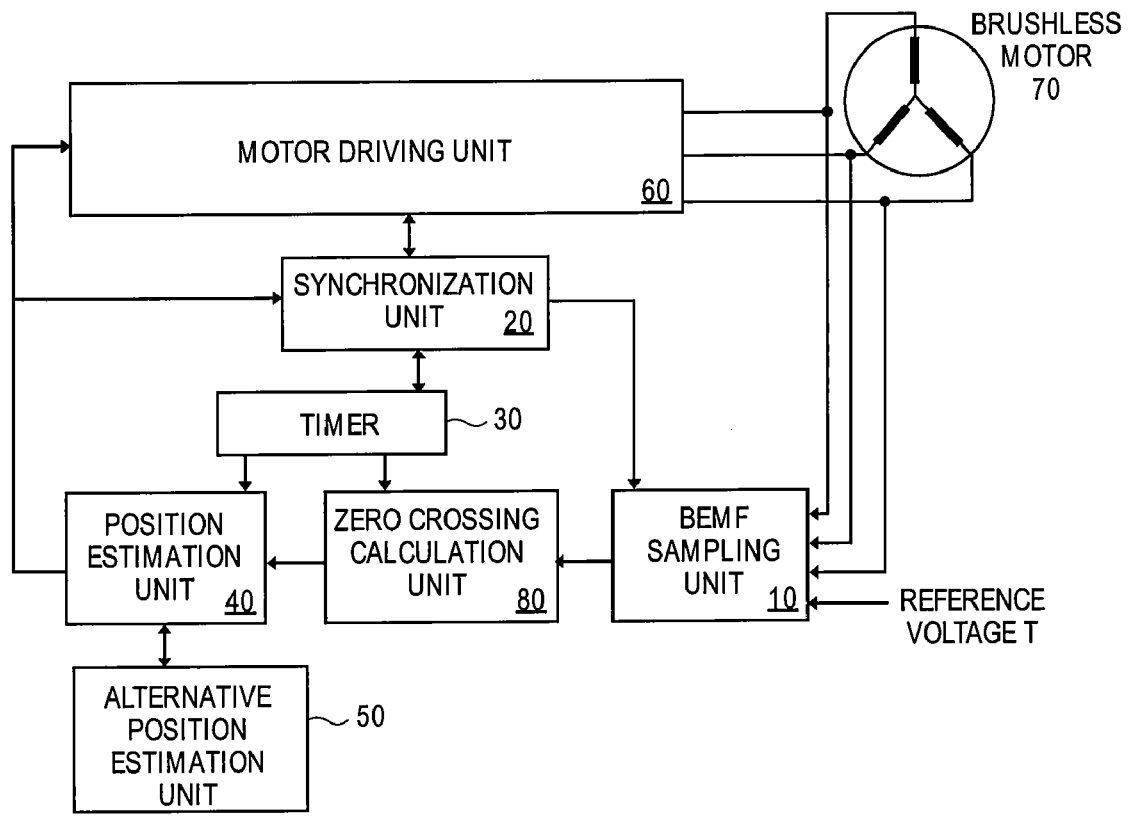
FIG. 7 is a schematic block diagram of a motor according to one embodiment.

Turning now to FIG. 7, a schematic diagram is shown of a BLDC motor which operates according to the above method. The motor three phase windings U, V, W (collectively 70) wherein the phase windings 70 are driven by waveforms produced in a motor driving unit 60. The particular shapes of the driving current waveforms can be optimized for a specific motor application and operating point. For example, the waveforms may have rectangular, trapezoidal or sinusoidal shapes. The method of the present invention is independent of the driving current waveform shapes.

The driving unit 60 is also operable to interrupt the driving waveform for a selected phase to provide an undriven period P for the determination of the zero crossing point according to the present invention. This interruption can be in response to a received interrupt signal.

The phase windings 70 are each also connected to a back EMF sampling unit 10. The sampling unit 10 is operable to sample the back EMF signal during the undriven period P, according to the above method. A reference voltage T is also input into sampling unit 10. This can be a fixed voltage or can be constructed from the phase voltages with a resistive divider or may be the central star point of the motor.

A timing unit 30 is used to provide a time reference signal for synchronizing back EMF signal measurements and for the calculation of the occurrence of zero crossing and hence for the estimation of the rotor position. A synchronization unit 20 is also provided to facilitate timing synchronization between the various systems and to generate the interrupt signal for the driving unit 60.

The zero crossing calculation unit 80 calculates a back EMF zero crossing point by interpolation according to the above method using the sample values output by the sampling unit 10 and the corresponding time signal from timing unit 30. The calculation unit 80 is further operable to determine whether a calculated zero crossing point is likely to be a valid zero crossing point.

In the event that the calculated zero crossing point is considered valid, the zero crossing point data is output to a position estimation unit 40. The position estimation unit 40, is operable to determine the position of the rotor in response to the zero crossing data. The position estimation unit 40 can also be operable to perform a rotor speed estimation, based on the interval between calculated zero crossings.

In the event that the calculated zero crossing point is considered invalid, then an alternative position estimation unit 50 is provided. This can be used to estimate the rotor position on occasions where the method of the present invention is not sufficiently accurate. This can occur when the motor is running at extremely low speeds or at stand-still.

The output of estimated position unit 40 (or when utilised, the alternative position estimation unit 50) is fed to motor driving unit 60. In response to the estimated rotor position, the motor driving unit 60 is operable to vary the driving current waveforms such that they synchronise with the rotor rotation.

Figure 8:
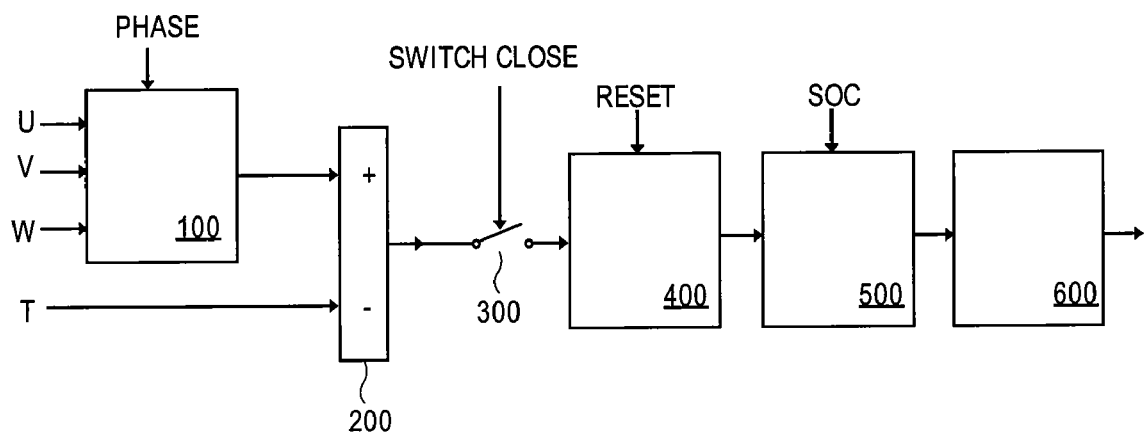
FIG. 8 is a schematic block diagram of a back EMF sampling unit for a motor according to one embodiment.

FIG. 8 shows a preferred implementation of the BEMF sampling unit 10, wherein the sampling unit 10 is operable to integrate the back EMF signal, so as to provide samples indicative of the back EMF signal value. Referring in more detail to FIG. 8, the sampling unit 10 comprises a multiplexer 100, a subtractor 200, a switch 300, an integrator 400, a sample and hold circuit 500 and an analogue to digital converter 600.

The multiplexer 100 is operable to select the motor phase U, V, W that is experiencing an undriven period P and is thus to be used for carrying out the method of the present invention. The multiplexer is operable to select a particular motor phase U, V, W in response to signals received from the synchronisation unit 20.

The subtractor 200 is operable to subtract a reference voltage T from the selected phase winding signal. This provides compensation for known offsets superimposed on the back EMF signal. The output of subtractor 200 is connected via switch 300 to integrator 400. The sampling unit 10 can also be provided with any suitable form of filtering means for example, an amplifier and/or a low pass filter.

In the present embodiment, the integrator 400 is operable to calculate the integral (over time) of an input signal received via the switch 300. The integrator 400 can be controlled by input signals. In particular, the integrator 400 can be reset to a defined state in response to a reset signal. The output of the integrator 400 is fed into a sample and hold circuit 500, which is connected to analogue to digital converter 600.

In operation, the integrator 400 is operable to integrate the input signal received from the time the switch is closed and output the result to sample and hold circuit 500. Upon receipt of an SOC signal, the sample and hold circuit 500 outputs the instantaneous integral value to analogue to digital converter 600. Once the integral value is output to the analogue to digital converter 600, the switch 300 is opened and the integrator of the filter 400 is reset.

Accordingly, the analogue to digital converter 600 provides the output values $ADC_1$ and $ADC_2$ required for the operation of the above method. The requisite integration periods $P_{i1}$ and $P_{i2}$ are defined by the Switch Close signal and the SOC signal. These signals are each generated by the synchronization unit 20.

The output values $ADC_1$ and $ADC_2$ are then utilised by the calculation unit 80 to calculate a zero crossing point. The calculated zero crossing point can then, in turn, be utilised by the position estimation unit 40 to estimate the rotor position, as described above.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An electric motor comprising:
a rotor;
a stator having a plurality of phase windings;
a back EMF sampling unit operable to sample a back EMF signal during an undriven period, wherein the back EMF sampling unit comprises an integrator connected to a sample and hold circuit, the integrator being operable to integrate the back EMF signal in response to a switch close signal and output to the sample and hold circuit and being operable to output a signal indicative of the integrated back EMF signal value in response to a switch open signal which stops the integration process;
wherein the motor is driven by a method comprising the steps of:
driving at least one of the plurality of phase windings with a suitable driving current waveform;
providing an undriven period during the driving waveform;
sampling the back EMF signal in the at least one of the plurality of phase windings on two or more occasions during the undriven period; and
interpolating the back EMF signal based on back EMF samples to thereby determine a zero crossing point for the at least one of the plurality of phase windings;
wherein the position of the rotor is sensed by a method comprising the steps of:
determining a zero crossing point for one or more of the plurality of phase windings by driving the one or more of the plurality of phase windings with a suitable driving current waveform;
providing the undriven period during the driving waveform;

sampling the back EMF signal in the one or more of the plurality of phase windings on two or more occasions during the undriven period;

interpolating the back EMF signal based on back EMF samples; and determining the position of the rotor based at least in part on the determined zero crossing point and interpolated back EMF signal.

2. An electric motor comprising:

a rotor;

a stator having a plurality of phase windings; and a back EMF sampling unit operable to sample a back EMF signal during an undriven period, wherein the back EMF sampling unit comprises:

an integrator connected to a sample and hold circuit, the integrator being operable to integrate the back EMF signal in response to a switch close signal and output to the sample and hold circuit, the combination of the integrator connected to the sample and hold circuit being operable to output a signal indicative of the integrated back EMF signal value in response to a switch open signal which stops the integration process.

3. An electric motor as claimed in claim 2 wherein the motor comprises a motor driving unit operable to generate the driving waveform for each phase winding of the motor and wherein the undriven period is provided by interrupting a driving waveform, and the motor driving unit is operable to interrupt the waveform in response to a suitable interrupt signal and to reinstate the waveform in response to a suitable interrupt end signal.

4. An electric motor as claimed in claim 2 wherein the back EMF sampling unit comprises a subtractor for removing a DC offset from the back EMF signal before it is integrated and comprises a filter.

5. An electric motor as claimed in claim 2 wherein the back EMF sampling unit comprises a multiplexer operable to connect the integrator to a selected phase winding.

6. An electric motor as claimed in claim 2 wherein the motor comprises a zero crossing calculation unit operable to calculate a zero crossing point by interpolation from one or more back EMF samples and whether the calculated zero crossing point is likely to be valid.

7. An electric motor as claimed in claim 6 wherein a position estimation unit is provided, the position estimation unit operable to estimate the position of the rotor based on the calculated zero crossing point.

8. An electric motor as claimed in claim 2 wherein the motor comprises a timing unit for providing a time signal and a synchronization unit connected to said timing unit and operable to output control and timing signals.

9. An electric motor as claimed in claim 2 wherein the motor is a brushless DC motor comprising a permanent magnet rotor and one or more interconnected phase windings associated with the stator of the motor.

* * * * *